UNITED STATES PATENT OFFICE.

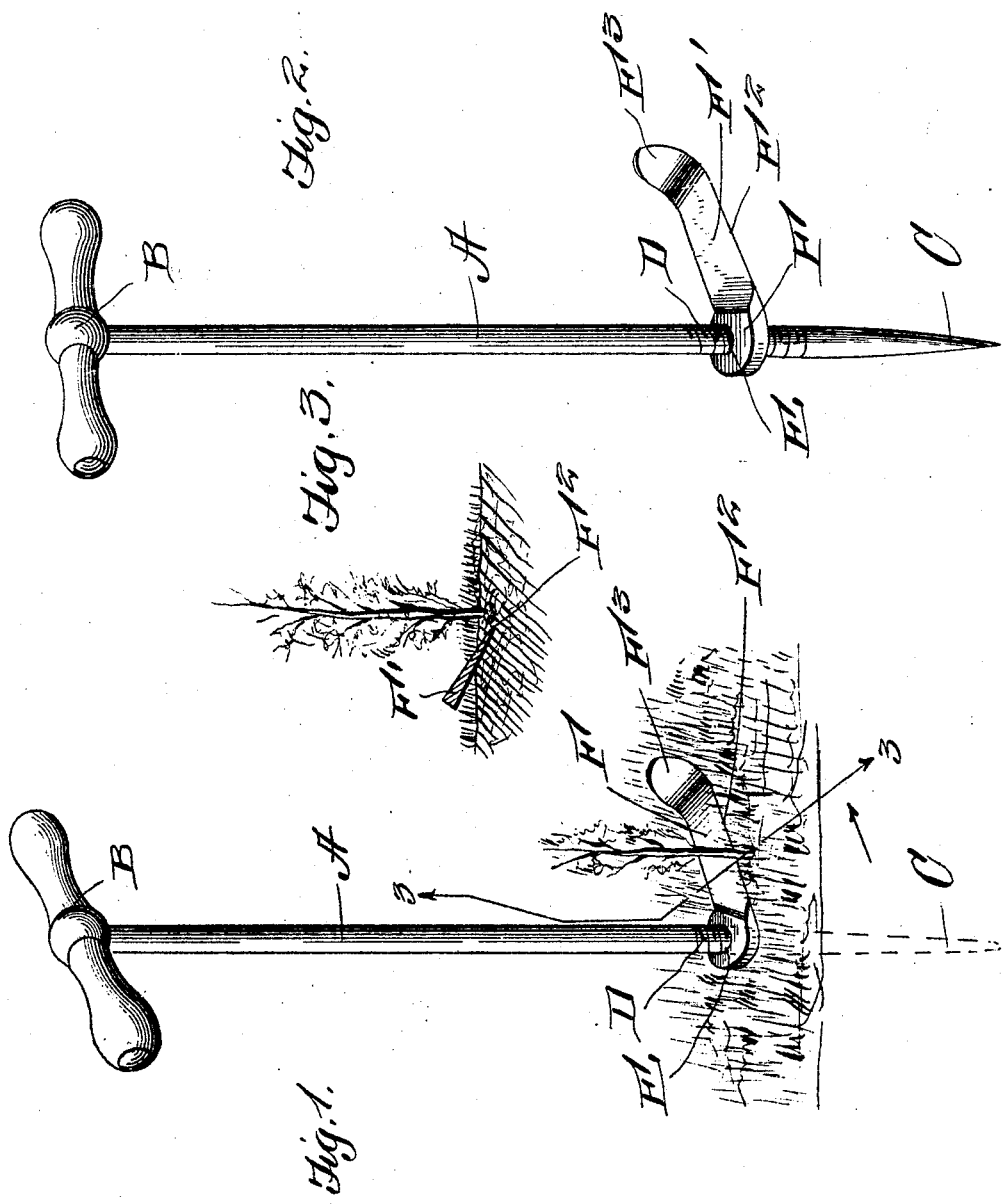

JOHN W. SHAFFER, OF CHARLESTON, ILLINOIS.

TOOL FOR EXTERMINATING WEEDS.

No. 799,359.        Specification of Letters Patent.        Patented Sept. 12, 1905.

Application filed June 1, 1905. Serial No. 263,250.

*To all whom it may concern:*

Be it known that I, JOHN W. SHAFFER, a citizen of the United States, residing at Charleston, in the county of Coles and State of Illinois, have invented certain new and useful Improvements in Tools for Exterminating Weeds; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to gardening-tools, and more particularly to that class used for removing weeds and other foreign matter from a lawn or a garden.

More especially the invention provides a device of this character which may be inserted into the ground for a distance until a knife which is mounted upon the tool, as shown in the drawings, is ready to cut into the soil below the grass, and as the knife is rotated by the turning of the tool the same will have a tendency to cut deeper as the tool is rotated, so that when the cutting edge of the knife comes into alinement with the root of a weed or other foreign matter the knife will cut below the root, allowing the weed to be drawn out very easily.

Furthermore, the invention comprises a rod having a handle mounted upon one end thereof to allow the same to be rotated and also a screw-threaded portion near the opposite end, which screw-threaded portion is adapted to receive a peculiarly-shaped knife having a screw-threaded aperture, the outer end of which is upturned.

To these ends and to such others as the invention may pertain the same comprises the peculiar arrangement and novel combination of features and adaptation of parts, which will be hereinafter more fully described and then specifically defined in the appended claims.

My invention is illustrated in the accompanying drawings, which, with the letters of reference marked thereon, form a part of this application, and in which drawings—

Figure 1 is a perspective view of my improved tool as applied in the act of cutting a weed. Fig. 2 is a perspective view of my improved tool; and Fig. 3 is a sectional view on line 3 3 of Fig. 1, showing substantially the angle of the knife as the same is rotated.

Reference now being had to the details of the drawings by letter, A designates a suitable rod which comprises the main part of the tool, having a handle B mounted on one end thereof, the other end of said rod being sharpened to a point, as at C. Provided near the sharpened end of the rod A are screw-threads D, which are engaged by a screw-threaded aperture E in an enlargement F of the knife F', said knife being provided with a knife-edge $F^2$ for the purpose of forming cutting means for the knife to allow the same to cut through the soil. The outer end of the knife is upturned, as at $F^3$, as shown clearly in the accompanying drawings.

From the foregoing detailed construction and combination of features of the above-set-forth invention the operation of the same will be understood by reference being had to the details of the drawings.

Of course it is distinctly understood that various changes can be made in the details of construction and combinations of parts other than those illustrated in the accompanying drawings, if desired, without in any way departing from the spirit and scope of the invention.

Having thus fully described my invention, what I claim as new, and desire to secure by Letters Patent, is—

1. In a device of the character described, the combination of a rod, one end of which is pointed, and the other end provided with a handle, said rod having a screw-threaded portion inserted through an aperture in a knife, substantially as shown and described.

2. A device of the class described, comprising a rod, one end of which is pointed, and the other provided with a handle, a screw-threaded portion upon said rod, screwed into an aperture in a knife, said knife comprising an enlargement upon one end thereof and an upturned portion at the opposite end, one edge of the knife intermediate the enlargement and the extreme end of the upturned portion being provided with a cutting edge, and the blade of said knife being disposed on a slight angle so that when the tool is rotated the knife will cut deeper as the same is rotated, as shown and described.

In testimony whereof I hereunto affix my signature in the presence of two witnesses.

JOHN W. SHAFFER.

Witnesses:
     T. E. STODDARD,
     C. C. DIGBY.